United States Patent [19]
van der Wal

[11] Patent Number: 5,244,932
[45] Date of Patent: Sep. 14, 1993

[54] POLYMER POLYOL DISPERSIONS, A PROCESS FOR MAKING THEM AND POLYURETHANE FOAMS PREPARED USING SUCH POLYOL DISPERSIONS

[75] Inventor: Hanno van der Wal, BV Delfzyl, Netherlands

[73] Assignee: The Dow Chemical Company, Midland, Mich.

[21] Appl. No.: 404,484

[22] Filed: Sep. 8, 1989

[30] Foreign Application Priority Data

Sep. 28, 1988 [GB] United Kingdom ............... 8822552

[51] Int. Cl.$^5$ .................. C08G 65/28; C08K 5/04; C08L 75/04
[52] U.S. Cl. .................. 521/137; 521/138; 521/170; 523/456; 525/407; 525/510; 525/524; 525/528; 528/110
[58] Field of Search .............. 521/137, 138, 170; 525/407, 510, 524, 528; 523/400, 456; 528/110

[56] References Cited
U.S. PATENT DOCUMENTS 4,258,137  3/1981  Cogliano ........................... 521/137
4,789,640  12/1988  Milovanovic-Lerik et al. ... 521/137
4,886,845  12/1989  Becker et al. ...................... 525/481

*Primary Examiner*—John Kight, III
*Assistant Examiner*—John M. Cooney, Jr.

[57] ABSTRACT

The dispersion of a polymer in a polyol is characterized in that the polymer is a product of
A) a reaction product of an epoxy compound and an aromatic acid and
B) an epoxy hardener
and the epoxy compound is the reaction product of a polyphenol an epihalohydrin, of a polyalcohol and an epihalohydrin, of an amine and an epihalohydrin, of a sulfur-containing compound and an epihalohydrin, of a polycarboxylic acid and an epihalohydrin or of a polyisocyanate and 2,3-epoxy-1-propanol or the reaction product of a mixture or polyphenols, polyalcohols, amines, sulfur-containing compounds, polycarbolic acids and/or polyisocyanates and an epihalohydrin.

The dispersion is useful for producing polyurethane foams.

20 Claims, No Drawings

POLYMER POLYOL DISPERSIONS, A PROCESS FOR MAKING THEM AND POLYURETHANE FOAMS PREPARED USING SUCH POLYOL DISPERSIONS

BACKGROUND OF THE INVENTION

The present invention relates to polymer polyol dispersions, to a process for making them and to polyurethane foams of which one component is such a polymer polyol dispersion. The present invention further relates to a process for preparing polyurethane foams wherein such a polymer polyol dispersion is used as a reaction component.

U.S. Pat. No. 3,789,044 relates to the composition of a polyisocyanate and a hydroxybenzoic acid capped epoxide-containing material. This composition is cured with a tertiary amine to yield durable and flexible coatings or binders.

German Offenlegungsschrift 3 133 103 relates to resins useful for coating compositions. The resins are produced by reacting an epoxy compound having at least two epoxy groups with a monocarboxylic acid having at least one hydroxyl-substituted aromatic radical at a molar ratio of 1:2. The coating composition may contain a cross-linking agent such as a phenol-formaldehyde resin etc. Alternatively, a portion of the hydroxyl groups of the resin may be reacted with a partially blocked polyisocyanate in order to allow internal cross-linking.

British Patent Application 2 059 977 relates to a method for preparing a rigid cross-linked polyurethane foam. In a first step, a flexible foam is produced from A. either (1) a urethane-containing prepolymer having polyether or polyester backbone segments endcapped with an aromatic isocyanate or (2) an aromatic polyisocyanate and a polyether or polyester polyol;

B. 0.4 to 1,000 moles of water per mole of NCO groups; and

C. an epoxy resin.

The epoxy resin can be partially modified, for example, by reaction with amines, carboxylic acids, thiols, phenols and alcohols.

After foaming and reshaping, the produced flexible foam is reacted with an epoxy curing agent. Alternatively, components A., B., C. and the epoxy curing agent can be reacted by mixing all components in a one-shot method.

The mentioned British Patent Application teaches that the use of large excesses of water lead to important advantages and improvements over the conventional polyurethane compositions.

The rigidized foam product is said to be useful for fluid filtering such as sewer treatment.

German Offenlegungsschrift 3 621 264 discloses rigid foams containing urethane and isocyanurate groups produced by reacting A) aromatic polyisocyanates with B) a mixture containing 2 to 50 weight percent of a tetra- to octafunctional polyether polyol having a hydroxyl number of 150 to 1200, 1 to 80 weight percent of a di- to pentafunctional polyester polyol having a hydroxyl number of 30 to 400, a blowing agent and a polyisocyanurate catalyst and C) an organic epoxy resin.

It is said that the use of the mixture of the polyether polyols and the special polyester polyols in the particular weight ratio in combination with small amounts of epoxy resins allows reducing the amount of flame retardant agents in the foams. French Patent 1,332,811 (equivalent to U.S. Pat. No. 3,238,273) relates to the production of a polyurethane foam by reacting a polyisocyanate or a polyisothiocyanate with a polyoxyalkylene-polyol in the presence of a modified glycidyl ether. The polyoxyalkylene-polyol preferably is the addition product of propylene oxide and glycerol which is reacted with ethylene oxide. The modified glycidyl ether can be produced by reacting a glycidyl ether, such as the reaction product of epichlorohydrin and glycerol, with a hydroxy-amine at increased temperature.

Unfortunately, none of the above-mentioned references contain any hint how to produce polymer dispersion polyols which are useful for producing polyurethane foams having the desired properties.

British Patent Application 2 146 345 suggests an epoxy-containing polymer polyol derived from an epoxy-containing monomer and a polyol for producing polyurethane resins having high rigidity and improved physical properties such as mechanical strength and heat resistance. The epoxy-containing polymer polyol is produced by polymerizing an unsaturated ester, ether, urethane, amide or acetal containing one or more epoxy radicals via their C=C double bond. These ethylenically unsaturated monomers can be copolymerized with ethylenically unsaturated nitriles and optionally with other monomers, such as ethylenically unsaturated hydrocarbons, in a polyol. The produced polymer polyol contains a large number of epoxy groups. When producing the polyurethanes, all or a part of the epoxy groups in the produced polymer polyol must be made to bring about ring-opening reaction, such as coupling of epoxy radicals to each other, reaction with an active hydrogen atom-containing compound or reaction with polyisocyanate, in the presence of an epoxy curing agent such as a polyamine, a polycarboxylic acid, an acid anhydride or an organic polyisocyanate. Although British Patent Application 2 146 345 indicates that the epoxy-containing polymer polyol is useful for producing high-resilient and firm, flexible and semi-rigid polyurethane foams, the epoxy-containing polymer polyol is mainly useful for producing noncellular or microcellular elastomers.

It would be desirable to provide new polymer polyols which are particularly useful for producing polyurethane foams.

A process for preparing polymer polyol dispersions by reacting an epoxy compound with an epoxy hardener in the presence of a liquid polyol is known from U.S. Pat. No. 4,305,861. In European Patent Application 0 232 124 it is disclosed that polyurethane foams which have a high flexibility, high resilience and/or high load bearing ability can be produced when using such polymer polyol dispersions. According to the examples of U.S. Pat. No. 4,305,861 the epoxy compound and epoxy hardener are dissolved in the polyol. The mixture is allowed to stand during 24 and 48 hours without stirring in order to allow the polyaddition reaction to take place.

Although this process may be useful on a laboratory scale, unfortunately it has several disadvantages when the polymer polyol dispersion should be produced on a larger scale. Heat is formed during the reaction which is not controllable in a large reactor due to the insufficient heat transfer in an unstirred reaction. Trials to stir the reaction mixture have resulted in flocculation or gelling of the material.

German Offenlegungsschrift 29 43 689 (equivalent to U.S. Pat. No. 4,305,861) relates to polymer polyol dispersions prepared by reacting epoxy resins with epoxy hardeners in the presence of liquid, high molecular weight polyols. The polymer polyol dispersions are said to be useful as clouding agents for plastic materials. Unfortunately, the same problems are faced when producing these polyol polymer dispersions as when producing the dispersions disclosed in European Patent Application 0 232 124.

European Patent Application 0 079 714 discloses phase stable compositions containing a paraffinic polyol chain extender and an isocyanate-reactive prepolymer containing hydroxy and epoxy groups. The prepolymer has been produced by reaction a diepoxide with a monocarboxylic or a dicarboxylic acid such that the prepolymer contains equal amounts of reactable epoxy groups and reactable secondary non-terminal hydroxy groups. The phase stable compositions can be reacted with a polyisocyanate. However, the European Patent Application relates to liquid compositions useful for producing poly(oxazolidone/urethane) thermoset compositions and does not teach how to provide polymer polyol dispersions that are useful for producing polyurethane foams having the desired properties.

Accordingly, one object of the present invention is to produce epoxy-type polymer polyol dispersions in a controllable fashion and substantially without formation of lumps.

One object of the present invention is to provide polymer polyol dispersions which are useful for producing polyurethane foams which have high flexibility, high resiliency and/or high load bearing ability.

SUMMARY OF THE INVENTION

Surprisingly, it has been found that the epoxy-type polymer polyol dispersions can be produced on a large scale by prereacting an epoxy compound of the type stated below with an aromatic acid before reacting the epoxy compound with the epoxy hardener.

Accordingly, one aspect of the present invention is a dispersion of a polymer in a polyol which is characterized in that the polymer is the product of A) a reaction product of an epoxy compound and an aromatic acid and B) an epoxy hardener and the epoxy compound is the reaction product of a polyphenol and an epihalohydrin, of a polyalcohol and an epihalohydrin, of an amine and an epihalohydrin, of a sulfur-containing compound and an epihalohydrin, of a polycarboxylic acid and an epihalohydrin or of a polyisocyanate and 2,3-epoxy-1-propanol or the reaction product of a mixture or polyphenols, polyalcohols, amines, sulfur-containing compounds, polycarbolic acids and/or polyisocyanates and an epihalohydrin.

Another aspect of the present invention is a process for the manufacture of a polymer polyol dispersion by prereacting the above-mentioned epoxy compound with an aromatic acid and then with an epoxy hardener in the presence of a polyol.

Preferred embodiments of the dispersion and process of the present invention are set forth in the dependent claims.

Stable polymer polyol dispersions are obtained by the process of the present invention. The use of the epoxy compound which has been prereacted with an aromatic acid allows the preparation of the polymer dispersion under stirring without substantial lump formation. Thereby, the reaction heat is controllable. Furthermore, the time for reaction can be considerably decreased. The stable polymer polyol dispersions have a low free epoxy resin content, in general less than 1,000 ppm, in many cases even less than 500 ppm, calculated and based on the weight of the epoxy group.

Furthermore, stable dispersions are obtained which in most of the cases have an average particle size of less than 5,000 nm.

Furthermore, the polymer polyol dispersion of the present invention is useful for producing polyurethane foams having high flexibility, high resilience and/or high load bearing ability.

Accordingly, another aspect of the present invention is a polyurethane foam which is the reaction product of at least one polyol and at least one polyisocyanate, characterized in that the polyol is at least partially the polymer polyol dispersion of the present invention.

A further aspect of the present invention is a process for preparing a polyurethane foam by reacting at least one polyol and at least one polyisocyanate in the presence of at least one blowing agent, which process is characterized in that at least a portion of the polyols employed is the polymer polyol dispersion of the present invention.

DETAILED DESCRIPTION OF THE INVENTION

For preparing the polymer polyol dispersion of the present invention, the epoxy compound is pretreated with an aromatic acid, for example, an aromatic carboxylic or sulfonic acid.

Aromatic monocarboxylic or monosulfonic acids such as benzoic or p-toluene sulfonic acid are preferred. More preferred aromatic monocarboxylic acids are those having one or more hydroxyl groups attached to the aromatic ring. Preferred examples thereof are the hydroxy benzoic acids such as 2-hydroxy benzoic acid which is commonly called salicylic acid and the dihydroxy benzoic acids such as 2,4- 3,5- or 2,5-dihydroxy benzoic acid. Salicylic acid and, in particular, 2,6-dihydroxy benzoic acid are the most preferred examples.

The epoxy compounds generally have an average of at least 1.5, preferably at least 2, reactive 1,2-epoxy groups per molecule. These epoxy compounds generally have an average of up to 6, preferably up to 4, most preferably up to 3, reactive 1,2-epoxy groups per molecule. These epoxy compounds can be monomeric or polymeric, saturated or unsaturated, aliphatic, cycloaliphatic, aromatic or heterocyclic and may be substituted, if desired, with other substituents in addition to the epoxy groups, e.g. hydroxyl groups, alkoxyl groups or halogen atoms.

Suitable epoxy compounds are the reaction products of polyphenols and epihalohydrins, polyalcohols and epihalohydrins, amines and epihalohydrins, sulfur-containing compounds and epihalohydrins, polycarboxylic acids and epihalohydrins, polyisocyanates and 2,3-epoxy-1-propanol (glycide). Preferred epoxy compounds are the reaction products of polyphenols and epihalohydrins, of polyalcohols and epihalohydrins or of polycarboxylic acids and epihalohydrins. Mixtures of polyphenols, polyalcohols, amines, sulfur-containing compounds, polycarboxylic acids and/or polyisocyanates can also be reacted with epihalohydrins.

Illustrative examples of epoxy compounds useful herein are described in *The Handbook of Epoxy Resins* by H. Lee and K. Neville, published in 1967 by McGraw-Hill, New York, in appendix 4-1, pages 4 to 56 and U.S. Pat. Nos. 2,633,458; 3,477,990 (particularly column 2, line 39 to column 4, line 75); 3,821,243; 3,970,719; 3,975,397 and 4,071,477 and G.B. Patent Specification No. 1,597,610 all of which are incorporated herein by reference.

Epoxy compounds of particular interest in the practice of the present invention include diglycidyl ethers of bisphenol compounds, particularly those compounds represented by the following general structural formula:

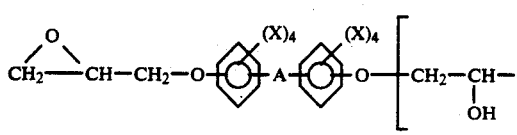 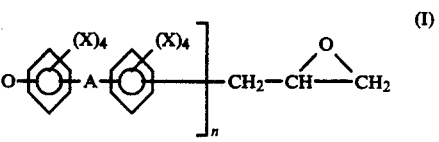  (I)

wherein:

each A independently is a divalent hydrocarbon group having from 1 to about 8 carbon atoms, preferably methylene or isopropylidene, —C(O)—, —O—, —S—, —S—S—, —S(O)—, —S(O)$_2$ or a covalent bond;

each X independently is hydrogen, an alkyl group of 1 to 6 carbon atoms or halogen, preferably chlorine or bromine; and n has an average value of from 0 to 35, preferably 0 to 10, most preferably 0 to 2.

The average epoxy equivalent weight is from 149, preferably from about 170, up to about 3000, preferably up to about 950, most preferably up to about 450.

The average epoxy equivalent weight is the average molecular weight of the resin divided by the number of epoxy groups per molecule. The molecular weight is a weighted average molecular weight.

Particularly preferred epoxy compounds are those wherein each A is methylene or isopropylidene, each X is independently hydrogen or bromine and n is on the average from 0 to 2. Preferred examples of these epoxy compounds are bisphenol A type epoxy compounds having an average epoxy equivalent weight of from about 170 to about 200. They are commercially available from The Dow Chemical Company as D.E.R. 330, D.E.R. 331 and D.E.R. 332 epoxy resins. Further preferred examples are brominated bisphenol A type epoxy compounds which for example, have an average epoxy equivalent weight of from about 300 to about 800.

Above-mentioned epoxy compounds can be obtained by reacting an epihalohydrin, such as epichlorohydrin with a polyhydric phenol, for example, 4,4'-isopropylidene bisphenol in a known way. Further examples of polyhydric phenols are disclosed in European Patent Application 0 232 124.

Further useful epoxy compounds are those obtained from the reaction of polyhydric alcohols with epihalohydrins. These alcohols can be polyether polyols or polyester polyols.

Another class of polymeric epoxy compounds which may be used for the purpose of the present invention includes the epoxy novolac resins. The epoxy novolac resins can be obtained by reacting, preferably in the presence of a basic catalyst, e.g. sodium or potassium hydroxide, an epihalohydrin, such as epichlorohydrin, with the resinous condensate of an aldehyde, e.g. formaldehyde, and either a monohydric phenol, e.g. phenol itself, or a polyhydric phenol. Further details concerning the nature and preparation of these epoxy novolac resins can be obtained in Lee, H. and Neville, K., *Handbook of Epoxy Resins*, McGraw Hill Book Co. New York, 1967, which teaching is included herein by reference.

Preferred epoxy compounds obtained from the reaction of polyhydric alcohols with epihalohydrins and preferred epoxy novolac resins are disclosed in European Patent Application 0 232 124 the teaching of which is incorporated herein by reference.

The above mentioned epoxy compound and aromatic acid are preferably reacted with each other in an inert reaction diluent, most preferably in the polyol which is used for preparing the polymer polyol dispersion.

The term "poly" as used herein, for example, in the terms polyepoxide, polyhydric, polyol and polyisocyanate, means two or more.

Polyols which are liquid at the temperatures of reaction between the epoxy compound and the aromatic acid and of reaction between the obtained product and an epoxy hardener are preferred. In general, the useful polyols have functionalities of from 2 to 8, preferably of from 2 to 4. Preferably used are polyester polyols and particularly polyoxyalkylene polyether polyols. Useful polyester polyols are described in European Patent Application 0 232 124.

Preferably used as polyols are polyoxyalkylene polyether polyols which are produced by known processes such as the reaction of one or more alkylene oxides with 2 to 6, preferably 2 to 4, carbon atoms in the alkylene radical and an initiator molecule containing 2 to 8, preferably 2 to 4, active hydrogen atoms.

Suitable alkylene oxides include 1,3-propylene oxide, 1,2- and 2,3-butylene oxide, and preferably, ethylene oxide and 1,2-propylene oxide. The alkylene oxides may be used individually, alternatingly in sequence, or in mixtures.

Examples of initiator molecules include lower polyols, polyamines and aminoalcohols having a total of two or more reactive hydrogen atoms or hydroxyl and/or primary or secondary amino groups. Suitable polyols are, for example, diols such as ethylene glycol, propylene glycol or diethylene glycol, and triols, such as glycerol or trimethylolpropane. Further useful initiator molecules are disclosed in European Patent Application 0 232 124 of which the teaching is included herein by reference.

Preferred polyether polyols of the branched-type are those prepared by adding propylene oxide alone or in combination with ethylene oxide to diols and triols, as starters to produce adducts of various molecular weights. Polyether polyols which deserve special mention are the 1,2,6-hexanetriol, 1,1,1-tris(hydroxymethyl)propane (trimethylolpropane) and glycerol adducts of propylene oxide or propylene oxide/ ethylene oxide having molecular weights (weight average value)

of from 1000 to 10 000, preferably from 2000 to 7000. These polyether polyols can be homo- or heteropolymers.

Preferred types of polyether polyols are block copolymers prepared from propylene and ethylene oxide with the above-described higher functional initiators. Block copolymers containing no more than about 35 weight percent of ethylene oxide are preferred. The most preferred polyether polyols are those derived from glycerol as an initiator which is first partially alkoxylated with a $C_{3-4}$ alkylene oxide component, for example, 1,3-propylene oxide, 1,2- or 2,3-butylene oxide, preferably 1,2-propylene oxide, and the intermediate then is ethoxylated with ethylene oxide. These polymers preferably contain from 1 to 25, more preferably from 5 to 20, weight percent ethylene oxide units, based upon the total molecular weight.

Other preferred polyether polyols are those which are derived from glycerol as an initiator which is alkoxylated with 1,2-propylene oxide and ethylene oxide to give a polyol with randomly distributed propylene oxide and ethylene oxide groups.

Advantageously, above mentioned block copolymers and the polyols with randomly distributed propylene oxide and ethylene oxide groups are used together.

Other preferred polyethers polyols are aminated block copolymers which are prepared from one or more alkylene oxides with 2 to 6, preferably 2 to 4, carbon atoms, more preferably 1,2-propylene oxide or ethylene oxide, with the above-described higher functional initiators, such as a lower polyol, preferably trimethylolpropane or, more preferably, glycerol, to produce an intermediate and the intermediate is converted into an amine terminated polyol. The conversion can be carried out in a known way by catalytic amination of the intermediate with ammonia in a hydrogen atmosphere whereby a portion of the terminal hydroxyl groups is converted into primary amine groups. These aminated polyols preferably contain from 1 to 25, more preferably from 2 to 15, most preferably from 5 to 10 weight percent primary amine units, based upon the total molecular weight.

Very useful aminated polyether polyols are those derived from glycerol as an initiator which is first partially alkoxylated with a $C_{3-4}$-alkylene oxide component, for example, 1,3-propylene oxide, 1,2- or 2,3-butylene oxide, preferably 1,2-propylene oxide, and the intermediate then is ethoxylated with ethylene oxide and a portion of the terminal hydroxyl groups is replaced by primary amine groups.

Such aminated polyether polyols preferably contain from 0 to 50, more preferably from 0 to 20 weight percent ethylene oxide units and from 5 to 90, more preferably from 10 to 40 percent of the terminal hydroxyl groups have been converted into primary amine groups.

The aminated polyols are preferably used together with other above-mentioned polyols. The amount of aminated polyol, based upon the total polyol weight, preferably is from 0.1 to 10, more preferably from 1 to 5 weight percent. Without wanting to be bound by the theory, it is assumed that the aminated polyol acts as a dispersant.

For preparing the reaction product A of an epoxy compound and an aromatic acid, the epoxy compound and the aromatic acid are heated in the polyol or polyol mixture at a temperature between 25° C. and 250° C., preferably between 80° C. and 160° C., more preferably between 100° C. and 130° C. during a period of from 20 to 240 minutes, preferably from 40 to 180 minutes.

Generally, the molar ratio between aromatic acid and epoxy groups is from 0.05 to 0.5:1, preferably from 0.1 to 0.3:1, more preferably from 0.125 to 0.25:1.

The reaction between the epoxy compound and the aromatic acid may be carried out with or without stirring. Stirring is preferred. Usual stirring rates are from 20 to 5,000 rpm, preferably from 50 to 1,000 rpm (revolutions per minute).

The reaction product A is then reacted with an epoxy hardener. This reaction preferably takes place in an above-mentioned polyol or polyol mixture, more preferably in the same reaction diluent which has been used to produce the reaction product A.

A wide range of epoxy hardeners can be used when preparing the polyol dispersions. The most useful hardeners are those compounds which have two or more $-NH_2$ groups. Those epoxy hardeners which may be employed are primarily the multifunctional, preferably di- to hexafunctional, and particularly di- to tetrafunctional primary amines, amides, hydrazides and hydrazine. Examples include aliphatic alkylene polyamines, e.g. diamines, with 1 to 12, preferably 1 to 6, most preferably 1 to 3, carbon atoms in the alkylene radical. Ethylene diamine is the most preferred epoxy hardener. Other useful epoxy hardeners are mentioned in European Patent Application 0 232 124. Mixtures of two or more amines are also useful.

Generally about 0.5 to about 2.5, preferably about 0.7 to about 1.5, more preferably about 0.8 to about 1.1 moles of the epoxy hardener are used per mole of the epoxy resins.

The reaction product A and epoxy hardener are preferably dissolved in the polyol or polyol mixture in such quantities that the resultant polymer polyol dispersion contains from 1 to 35 percent by weight, preferably from 5 to 25 percent by weight, polymer particles, based on the total weight of the dispersion. The epoxy hardener is added batch-wise or continuously to the polyol containing the reaction product A. Preferably, the epoxy hardener has been dissolved in an organic solvent, for example, in an above-mentioned polyol or polyol mixture before its addition to the reaction product A. The continuous addition may take from 1 to about 30 hours, preferably from about 5 to about 20 hours. The reaction between the reaction product A and the epoxy hardener is allowed to take place at a rate of reaction which can be adjusted by means of the reaction temperature. During this process, the initially clear solution changes into a milky dispersion. The size of the polymer particles in the polyol dispersion can be influenced by the selection of the raw materials as well as their concentration in the polyol and the reaction temperature. Reaction temperatures of generally 0° C. to 150° C., preferably 20° C. to 120° C., most preferably 30° C. to 90° C., work well.

However, if the reaction temperature and the feed rate of the epoxy hardener is too high, agglomeration of the solid particles can take place, depending on the solids content of the dispersion. It is however within the knowledge of the skilled artisan to choose the appropriate reaction temperature and feed rate of the epoxy hardener.

The reaction times are a function of the temperature and are dependent upon the chemical structure of the resins and the epoxy hardeners. When using polyamines as epoxy hardeners, for instance, the rate of the polyaddition reaction can be influenced by the amine's basicity as well as by steric factors. Generally, the reaction times are between 30 minutes and 10 days, preferably between 5 hours and 60 hours. Stirring decreases the reaction period considerably; stable dispersions can be obtained within 10 hours.

Although not mandatory, it is advantageous to use dispersing agents in the reaction between reaction product A and the epoxy hardener. Useful dispersing agents are known in the art. The most preferred dispersing agent is an above-described aminated polyol. Generally from 0 to 10, preferably from 1 to 5 weight percent dispersing agent is used, based on the weight of the epoxy compound.

The reaction between reaction product A and the epoxy hardener is preferably carried out under stirring. Useful stirring rates are from about 1 to about 1,000 rpm (revolutions per minute), preferably from about 20 rpm to 500 rpm.

Although it is preferred to preheat the epoxy compound and the aromatic acid in the polyol or polyol mixture and then to add the epoxy hardener as described above, it is also possible to dissolve the epoxy compound, the aromatic acid and the epoxy hardener together in the polyol or polyol mixture. Alternatively, the aromatic acid may be separately dissolved in a polyol or polyol mixture to which the epoxy compound and the epoxy hardener are separately added batch-wise or continuously. Also the epoxy compound and epoxy hardener are preferably dissolved in a polyol or polyol mixture. The above-mentioned reaction temperatures and time periods for adding the starting materials and carrying out the reaction may be applied.

When the produced polymer polyol dispersions have a polymeric solids content of 20 percent by weight of the polyether polyol, the dispersion generally has a viscosity of up to 10,000 mPa·s, preferably from 2,000 to 8,000 mPa·s, more preferably from 2,000 to 6,000 mPa·s at 25° C.

The polymer particles in the dispersion generally have average diameters of 10 nm to 20,000 nm, preferably of 50 nm to 10,000 nm, most preferably of 100 nm to 3,000 nm.

The polymer polyol dispersions are reacted with polyisocyanates in the presence of a blowing agent. Before reacting the polyol dispersion with the polyisocyanate(s), the polyol dispersion can be mixed with any unmodified polyol, as mentioned above. For examples, the polyol used for preparing the dispersion and the polyol used for diluting the dispersion can be the same.

Essentially any organic polyisocyanate may be used. Thus, it is possible in accordance with the present invention to utilize aliphatic, cycloaliphatic, aromatic-aliphatic, aromatic and heterocyclic polyisocyanates, as for example, described in Justus Liebig's Annalen der Chemie, 562, pages 75 to 136 by W. Siefgen, the disclosure of which is included by reference.

Specific examples of useful isocyanates are enumerated in European Patent Application 0 232 124. In general, it is particularly preferred to use the most readily available polyisocyanates, such as 2,4- and 2,6-toluene diisocyanate or mixtures of these isomers (TDI), polyphenyl-polymethylene polyisocyanates, of the type obtained by condensing aniline with formaldehyde, followed by phosgenation (crude MDI); or polyisocyanates containing carbodiimide groups, urethane groups, allophanate groups, isocyanurate groups, urea groups or biuret groups (so-called modified polyisocyanates) or mixtures of any of these polyisocyanates.

Preferably, the organic polyisocyanate is employed in an excess of 0 to 25 weight percent, preferably 0 to 15 weight percent, based on the weight of polyisocyanate consumed in the reaction. However, it is also possible to employ only 80 to 100, for example, 90 to 100, weight percent of the amount of polyisocyanate which is theoretically consumed in the reaction.

Suitable blowing agents are those which are generally known for producing polyurethane foams, for example, volatile halocarbons, low-boiling hydrocarbons or gas generating blowing agents such as water. Specific examples of useful blowing agents are mentioned in European Patent Application 0 232 124.

The amount of blowing agent employed will vary with the density desired in the foam product and the blowing agent used. Volatile halocarbons or hydrocarbons can generally be used in an amount of from 1 to 50, preferably of from 2 to 30, weight percent, based on the weight of the polyol of the polymer polyol dispersion. Water can generally be used in an amount of from 0 to 6, preferably of from 0.5 to 5, most preferably of from 1.5 to 4 weight percent, based on the weight of polyol of the polymer polyol dispersion.

Optionally, in the polyurethane technology known additives, for example, foaming catalysts, silicones, coloring agents and fire retardant agents may be used when producing the foams. Suitable foaming catalysts, their useful amounts and optionally used cell control agents are disclosed in European patent Application 0 232 124.

The process for producing polyurethane foams in the presence of water and/or organic blowing agents as well as additives which are well-known in the polyurethane foaming technology, is known in the art.

The process of the present invention differs from the known processes in that above-mentioned polymer polyol dispersions are employed alone or in combination with conventional unmodified polyols for reacting with polyurethanes.

The following examples illustrate the present invention. Unless otherwise mentioned, all parts and percentages are weight parts and weight percentages. The examples should not be construed to limit the present invention.

EXAMPLES

A) Preparation of Polymer Polyol Dispersions

Following compounds are used to prepare the polyol dispersions:

A polyether triol (1) prepared by reacting glycerol as an initiator with propylene oxide and capping the obtained intermediate with 13 to 15 percent ethylene oxide, based upon the total weight, having an average molecular weight of 4800. The polyol is commercially available from The Dow Chemical Company as VORANOL (Trademark) CP 4800 polyol.

A polyether triol (2) prepared by reacting glycerol as an initiator with propylene oxide and capping the obtained intermediate with 11 percent ethylene oxide, based upon the total weight, having an average molecular weight of 4,800. The polyol is commercially available from The Dow Chemical Company as VORANOL (Trademark) CP 4610 polyol.

An epoxy resin (3) of formula I wherein each X is hydrogen, each A is $-C(CH_3)_2-$ and n has such an average value that the average epoxy equivalent weight is from 182 to 192. The bisphenol A type resin is commercially available from The Dow Chemical Company as D.E.R. (Trademark) 331 resin.

An epoxy resin (4) of formula I wherein each X is hydrogen, each A is —$C(CH_3)_2$— and n has such an average value that the average epoxy equivalent weight is from 172 to 176. The bisphenol A type resin is commercially available from The Dow Chemical Company as D.E.R. (Trademark) 332 resin.

An aminated polyether triol (5), having an average molecular weight of 4,800, prepared by reacting glycerol as an initiator with propylene oxide and capping the obtained intermediate with 14 percent ethylene oxide, based upon the total weight, and aminating 25 percent of the terminal hydroxyl groups.

EXAMPLE 1

7.7 parts of salicylic acid and 63 parts of epoxy resin (3) are dissolved in 470 parts of polyether triol (2) under stirring. The reaction mixture is heated to 120° C. and maintained at this temperature for two hours under stirring at 100 rpm.

9.3 parts of ethylene diamine is added over a period of 360 minutes at a temperature of 40° C. and the reaction mixture is kept for 360 minutes at 75° C. under stirring at 100 rpm.

The solids content of the produced polymer polyol dispersion is 14.3 percent. The viscosity of the dispersion is about 1,600 mPa·s at 25° C. The dispersion is stable having a particle diameter of about 1 to 3 micrometers.

COMPARATIVE EXAMPLE A

Example 1 is repeated, however, 3.7 parts of acetic acid is used instead of 7.7 parts of salicylic acid. The produced dispersion contains clusters having a diameter of more than 100 micrometers.

COMPARATIVE EXAMPLE B

Example 1 is repeated, however, epoxy resin (3) is dissolved and heated in polyether triol (2) without addition of an acid. The produced dispersion contains particles having a diameter of 30 to 70 micrometers. The particles separate from the liquid within one day.

EXAMPLE 2

4 parts of 2,6-dihydroxy benzoic acid is dissolved in 160 parts of polyether triol (1) at room temperature upon stirring at 100 rpm in a glass reactor equipped with a mechanical stirrer, a thermocouple, a reflux condenser and an inlet tube for nitrogen. To the resulting solution 36 parts of epoxy resin (4) is added and stirred at 150 rpm for 30 minutes. Then 6.5 parts of ethylene diamine is added upon stirring at 200 rpm for additional 30 minutes. The resulting solution is then slowly heated to 60° C. upon continued stirring. The temperature and stirring are maintained for 10 hours. Stirring is then continued for additional 12 hours. The obtained dispersion has particle sizes of 1 to 3 micrometers. It has a solids content of 19.7 percent and a viscosity of 2,800 mPa·s at 25° C. It contains less than 1 percent unreacted epoxy resin (4) and about 0.1 percent unreacted ethylene diamine.

EXAMPLE 3

A stable polymer polyol dispersion is also obtained when repeating Example 2 but without continuous stirring.

EXAMPLE 4

964 parts of polyether triol (2), 25 parts of an aminated polyether triol (5) and 32.5 parts of salicylic acid are placed in a glass reactor equipped with a mechanical stirrer, a thermocouple, a reflux condenser and an inlet tube for nitrogen. The mixture is stirred until the salicylic acid has been dissolved. 8.5 parts of ethylene diamine is added. To the resulting solution 104 parts of a solution consisting of 52 parts of an epoxy resin (3) in a polyether triol (2) is added and the temperature of the reaction mixture is raised from 25° C. to 75° C. After about 3 hours fine particles of the produced polyol dispersion are visible.

EXAMPLE 5

The glass reactor of Example 4 is loaded with a solution of 32.4 parts of ethylene diamine, 32.5 parts of salicylic acid, 25 parts of aminated polyether triol (5) and 694 parts of polyether triol (2). 104 parts of a solution consisting of 52 parts of an epoxy resin (3) in a polyether triol (2) is added and the temperature of the reaction mixture is raised from 25° C. to 75° C. The mixture is allowed to react overnight at 75° C. The average particle size of the polymers in the dispersion is 0.6 micrometers.

EXAMPLE 6

125.3 parts of salicylic acid, 3562 parts of polyether triol (2), 210 parts of aminated polyether triol (5) and 1014 parts of epoxy resin (3) are placed in a round bottom 3 neck flask which is equipped with an overhead stirrer and is heated with the aid of a thermostat bath. The reaction mixture is kept at 120° C. for 1 hour upon stirring at 30 rpm. The reaction mixture is allowed to cool to 40° C. and 87.5 parts of ethylene diamine dissolved in 542 parts of polyether triol (2) is continuously added over a period of 8 to 10 hours upon stirring. 58.3 parts of ethylene diamine dissolved in 362 parts of polyether triol (2) is continuously added over a period of about 6 hours at 40° C. After the entire amount of ethylene diamine has been added the temperature of the reaction mixture is raised to 70° C. and the reaction is completed under continuous stirring.

The trial is repeated 5 times.

The molar ratio between added ethylene diamine and epoxy resin (3) is 0.9 to 1. The average conversion of the epoxy resin (3) is 97.9 percent. The average solids content is 20.9 percent, based on the total weight of the dispersion, the solids content of the 6 produced polymer polyol dispersions ranging from 20.7 percent to 21.3 percent. The average viscosity is 3170 mPa·s at 25° C.

The free epoxy resin content is 3.5 mg per g total dispersion, the free epoxy resin content of the 6 produced polymer dispersions ranging from 2.1 mg to 4.0 mg per gram dispersion. Most of the polymer particles in the dispersion have a diameter of less than 3 micrometers. A minor portion of the particles has a diameter between 3 micrometers and 10 micrometers.

COMPARATIVE EXAMPLE C 2.24 parts of oxalic acid, 122.5 parts of polyether triol (2), 3.84 parts of aminated polyether triol (5) and 33.7 parts of epoxy resin (3) are heated at 120° C. for 1 hour as in Example 6. 5.37 parts of ethylene diamine dissolved in 30 parts of polyether triol (2) is added to the reaction mixture in the same manner as in Example 6. Upon addition of the first drops of ethylene diamine dissolved in polyether triol (2), the reaction mixture becomes cloudy and clustered particles having a diameter of about 25 micrometers are formed.

Upon stirring at 75° C. the clusters disappear. The particle diameter of the final product is about 10 micrometers. The molar ratio between added ethylene diamine and epoxy resin (3) is 1.0 to 1. The viscosity of the final product is 3,500 mPa·s at 25° C. The free epoxy resin content is 67.0 mg per gram solids, that is, the final conversion of epoxy resin (3) is only 40 percent. The solids content is about 20 percent, based on the total weight of the dispersion. The dispersion having an undesirably high free epoxy content is not useful for preparing polyurethane foams. When the dispersion is blended with other polyols, catalysts and other compounds used for preparing the polyol component of the polyurethane foam, the resulting blend does not have sufficient shelf-life, i.e. is unstable.

COMPARATIVE EXAMPLE D

In order to evaluate the properties of a polymer polyol dispersion when the aromatic acid is not prereacted with the epoxy resin several Comparative Examples have been carried out wherein a reaction mixture has been prepared by dissolving salicylic acid and a small portion of the ethylene diamine and of the epoxy resin (3) in polyether triol (2) and aminated polyether triol (5). To this reaction mixture a first stream of epoxy resin (3) dissolved in polyether triol (2) and a second stream of ethylene diamine dissolved in polyether triol (2) and aminated polyether triol (5) have been continuously added. The feed rate, stirring speed, temperature, the portion of ethylene diamine and epoxy resin (3) in the initial reaction mixture, the amount of salicylic acid and aminated polyether triol (5) and the molar ratio of ethylene diamine to epoxy resin (3) have been varied for optimizing the produced polymer polyol dispersion.

The optimized experiment is carried out as follows:

A reaction mixture is prepared by dissolving 3.25 parts of salicylic acid, 3.5 parts of aminated polyether triol (5), 0.63 parts of ethylene diamine and 3.37 parts of of epoxy resin (3) in 98.1 g of polyether triol (2) upon stirring at 300 rpm. The reaction mixture is heated to 80° C. and a first stream of 30.33 g of epoxy resin (3) dissolved in 30.33 g of polyether triol (2) and a second stream of 5.67 g of ethylene diamine dissolved in 21.16 g of polyether triol (2) and 3.5 g of aminated polyether triol (5) are continuously added over a period of 10 hours while stirring is continued.

The solids content of the produced polymer polyol dispersion is about 19 percent. Clustered particles are formed with a diameter of 5 to 20 micrometers. Such a particle size is typically undesirably high for producing high quality foams using the polymer polyol dispersion.

EXAMPLE 7

A reaction mixture is prepared consisting of 1.35 percent of 2,6-dihydroxy benzoic acid, 61.7 percent of polyether triol (2), 1.9 percent of aminated polyether triol (5) and 16.9 percent of epoxy resin (3). The reaction mixture is heated to 42° C. and 3.15 percent of ethylene diamine dissolved in 150 percent of polyether triol (2) is added as described in Example 6.

The reaction is carried out twice.

The molar ratio between added ethylene diamine and epoxy resin (3) is 1.17. The average solids content is 20.6 percent, based on the total weight of the dispersion, the average viscosity is 3,000 mPa·s at 25° C. and the free epoxy resin content is 1.8 mg per g dispersion.

The polymer particles in the dispersion are uniform and have a diameter of 1 to 2 micrometers.

Reactivity of Benzoic Acid, Salicylic Acid and 2,6-Dihydroxy Benzoic Acid

Salicylic acid is reacted with the epoxy resin (3) in polyether triol (2) and in the aminated polyether triol (5) at 120° C. as described in Example 6.

For determining the amount of unreacted salicylic acid, samples are taken at various time intervals and a titration is carried out using 0.1N NaOH in methanol. The percentage of reacted salicylic acid is then calculated. After an hour nearly 45 percent of salicylic acid has reacted. After 1½ hours nearly 55 percent, after 2 hours more than 60 percent and after 2½ hours about 70 percent of salicylic acid has reacted.

When using benzoic acid instead of salicylic acid, 10 percent of benzoic acid has reacted after 3 hours.

When using 2,6-dihydroxy benzoic acid instead of salicylic acid, more than 95 percent of 2,6-dihydroxy benzoic acid has reacted within less than 15 minutes.

B) Foam Preparation

The following components are used for producing polyurethane foams:

A polymer polyol dispersion produced according to Example 6

A polyether triol (6) prepared by reacting glycerol as an initiator with propylene oxide and capping the obtained intermediate with 13 to 15 percent ethylene oxide, based upon the total weight, having an average molecular weight of 4,800. The polyol is commercially available from The Dow Chemical Company as VORANOL (Trademark) CP 4711 polyol.

A polyether triol (7) prepared by reacting glycerol as an initiator with propylene oxide and capping the obtained intermediate with 15 percent ethylene oxide, based upon the total weight, having an average molecular weight of 4,800. The polyol is commercially available from The Dow Chemical Company as VORANOL (Trademark) V 4702 polyol.

A silicone surfactant, commercially available from T.H. Goldschmidt AG as Tegostab B 8629.

A silicone surfactant, commercially available from T.H. Goldschmidt AG as Tegostab B 8650.

Triethylene diamine (33 weight percent in dipropylene glycol), commercially available from Air products and Chemicals, Inc. as DABCO 33 LV.

Bis(2-dimethyl aminoethyl)ether (70 weight percent in dipropylene glycol), commercially available from Union Carbide as Niax A1.

N-Dimethyl aminoethyldimethyl formamide in an ethoxyl alkylphenol type solvent, commercially available from Union Carbide as Niax A4.

The isocyanate employed is a mixture of 80 weight percent 2,4-toluenediisocyanate and 20 weight percent 2,6-toluenediisocyanate which mixture is commercially available from The Dow Chemical Company as VORANATE (Trademark) T80 isocyanate.

The isocyanate index is from 100 to 110. The isocyanate index minus 100 indicates the molar excess of isocyanate over the stoichiometric amount required for the reaction with the polyol and water (in percent).

The physical properties of the foams are measured according to the following standard methods Tensile strength: ASTM D638

Elongation: ASTM D638
Tear resistance: DIN 53575
Compression set: DIN 53572
Resilience: ASTM D3574
40% compression load deflection: (CLD) DIN 53577
Hysteresis: DIN 53577
Modulus: derived from DIN 53577

EXAMPLES 8 TO 16

A mixture of 50 weight parts of polyether triol (7) and 50 weight parts of the polymer polyol dispersion of Example 6 is prepared. The mixture has a weight of about 2 kg.

Based on 100 weight parts polyol/polymer polyol dispersion, the following compounds are added to the mixture:
Water: 2.8 weight parts
Tegostab B8629: 1.0 weight parts
Niax A1: 0.15 weight parts
Niax A4: 0.30 weight parts
Dabco 33LV: 0.7 weight parts The temperature of the above-mentioned compounds is maintained between 19° C. and 25° C.

The isocyanate mixture having the same temperature is added at an index of 100 in Examples 8 to 10, of 110 in Examples 11 to 13 and of 105 in Examples 14 to 16. The resulting mixture is poured in a mould which is maintained at a temperature between 44° C. and 48° C.

The resulting foam piece is removed from the mould after 6 minutes in Examples 8 to 12 and 14 to 16 and after 8 minutes in Example 13 respectively.

All produced foam samples are crushed by rollers to the same height. The samples are allowed to cure at room temperature before testing their physical properties.

The physical properties of the foam samples produced according to Examples 8 to 16 are listed in Table I.

The physical properties of the foam samples produced according to Examples 17 to 22 are listed in Table II.

TABLE 2

| Examples | | 17 | 18 | 19 | 20 | 21 | 22 |
|---|---|---|---|---|---|---|---|
| Core density | kg/m³ | 38.6 | 40.0 | 43.1 | 38.8 | 41.7 | 43.7 |
| Resilience | | 66 | 64 | 64 | 66 | 65 | 65 |
| Comp. set 75% dry | % | 8.3 | 8.2 | 8.6 | 7.3 | 6.8 | 7.2 |
| CLD | | | | | | | |
| 65% | kPa | 4.9 | 5.8 | 7.2 | 7.0 | 8.4 | 9.7 |
| 40% | kPa | 1.9 | 2.2 | 2.7 | 2.5 | 3.2 | 3.7 |
| Hysteresis | % E | 14.6 | 16.6 | 16.5 | 15.7 | 16.1 | 16.6 |
| Moldulus | | 2.9 | 2.9 | 2.8 | 2.9 | 2.8 | 2.8 |
| Tensile strength | kPa | 138 | 147 | 173 | 149 | 171 | 182 |
| Elongation | % | 141 | 142 | 140 | 122 | 121 | 118 |
| Tear resistance | N/m | 343 | 385 | 404 | 397 | 396 | 438 |
| Wet comp. set 50% | % | 10.5 | 8.8 | 8.5 | 7.9 | 7.5 | 7.9 |

What we claimed is:

1. A dispersion of a polymer in a polyol wherein the polymer is a product of the reaction of
   A) an epoxy compound and an aromatic monocarboxylic or monosulfonic acid and
   B) an epoxy hardener
   wherein the epoxy compound is a reaction product of a polyisocyanate and 2,3-epoxy-1-propanol or a reaction product of an epihalohydrin and one or more compounds selected from the group consisting of polyphenols, polyalcohols, amines, sulfur-containing compounds, polycarboxylic acids and polyisocyanates.

2. The dispersion of claim 1 wherein the aromatic acid is an aromatic monocarboxylic acid.

3. The dispersion of claim 1 wherein the aromatic acid is an aromatic carboxylic acid having one or more hydroxyl groups attached to the aromatic ring.

4. The dispersion of claim 3 wherein the aromatic carboxylic acid is salicylic acid or 2,6-dihydroxy benzoic acid.

5. The dispersion of claim 1 wherein the epoxy hardener is an alkylene diamine having 1 to 12 carbon atoms.

6. The dispersion of claim 5 wherein the epoxy hardener is an alkylene diamine having 1 to 3 carbon atoms.

7. The dispersion of claim 1 wherein the epoxy compound is the reaction product of a polyphenol and an epihalohydrin, of a polyalcohol and an epihalohydrin or of a polycarboxylic acid and an epihalohydrin.

8. The dispersion of claim 1, wherein the epoxy compound has the formula I

TABLE 1

| Examples | | 8 | 9 | 10 | 11 | 12 | 13 | 14 | 15 | 16 |
|---|---|---|---|---|---|---|---|---|---|---|
| Core density | kg/m³ | 37.6 | 40.6 | 43.2 | 38.4 | 40.9 | 43.7 | 37.3 | 41.7 | 45.2 |
| Resilience | | 66 | 64 | 64 | 65 | 66 | 65 | 65 | 66 | 67 |
| Comp. set 75% dry | % | 9.8 | 9.1 | 8.6 | 7.6 | 8.0 | 7.3 | 8.9 | 7.7 | 7.5 |
| CLD | | | | | | | | | | |
| 65% | kPa | 4.99 | 6.4 | 7.1 | 6.5 | 7.7 | 9.3 | 6.2 | 7.4 | 8.6 |
| 40% | kPa | 1.9 | 2.4 | 2.7 | 2.4 | 3.0 | 3.5 | 2.3 | 2.9 | 3.4 |
| Hysteresis | % E | 14.6 | 16.6 | 16.0 | 15.8 | 15.9 | 16.5 | 16.0 | 15.0 | 14.9 |
| Moldulus | | 2.9 | 2.9 | 2.8 | 2.9 | 2.8 | 2.8 | 2.9 | 2.8 | 2.8 |
| Tensile strength | kPa | 130 | 156 | 166 | 144 | 162 | 194 | 158 | 189 | 187 |
| Elongation | % | 136 | 140 | 142 | 128 | 126 | 124 | 125 | 120 | 130 |
| Tear resistance | N/m | 350 | 405 | 430 | 388 | 416 | 458 | 404 | 433 | 457 |
| Wet comp. set 50% | % | 13.1 | 11.1 | 11.1 | 8.6 | 8.5 | 8.3 | 11.1 | 9.0 | 8.4 |

EXAMPLES 17 TO 22

The procedure according to Examples 8 to 16 is repeated except that a polyether triol (6) is used instead of a polyether triol (7). The isocyanate index is 100 in Examples 17 to 19 and 110 in Examples 20 to 22 respectively. The produced foam piece is removed from the mould after 6 minutes in Examples 17 to 20 and after 8 minutes in Examples 21 and 22 respectively.

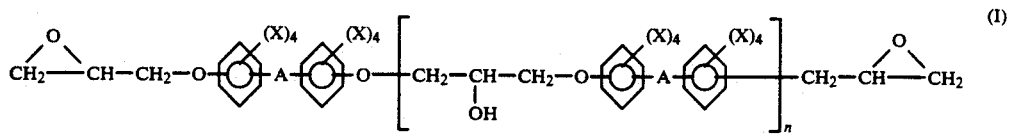

wherein
- each A independently is a divalent hydrocarbon group having from 1 to 8 carbon atoms, —C(O)—, —O—, —S—, —S—S—, —S(O)—, —S(O)$_2$— or a covalent bond,
- each X independently is hydrogen, an alkyl group of 1 to 6 carbon atoms, chlorine or bromine,
- n has an average value of from 0 to 35,
- and the average epoxy equivalent weight is from 149 to 950.

9. The dispersion of claim 8 wherein the epoxy resin has the formula I wherein each A independently is methylene or isopropylidene, each X independently is hydrogen or bromine and n has an average value from 0 to 2.

10. The dispersion of claim 1 wherein the polyol is a block-copolymer prepared from a lower polyol, polyamine or aminoalcohol initiator having a total of two or more reactive hydrogen atoms on hydroxyl and/or primary or secondary amine groups and C$_{2-6}$-alkylene oxides, which block-copolymer has a weight average molecular weight of from 1,000 to 10,000.

11. The dispersion of claim 1 wherein 0.1 to 10 percent of the total polyol weight are aminated block copolymers prepared by a) copolymerization of a lower polyol, polyamine or aminoalcohol initiator having a total of two or more reactive hydrogen atoms on hydroxyl and/or primary or secondary amine groups with one or more C$_{2-6}$-alkylene oxides and b) amination of the prepared block copolymer polyol such that the aminated block copolymer contains from 1 to 25 weight percent primary amine groups based upon the total molecular weight.

12. The dispersion of claim 3 wherein 0.1 to 10 percent of the total polyol weight are aminated block copolymers prepared by a) copolymerization of a lower polyol, polyamine or aminoalcohol initiator having a total of two or more reactive hydrogen atoms on hydroxyl and/or primary or secondary amine groups with one or more C$_{2-6}$-alkylene oxides and b) amination of the prepared block copolymer polyol such that the aminated block copolymer contains from 1 to 25 weight percent primary amine groups based upon the total molecular weight.

13. The dispersion of claim 10 wherein 0.1 to 10 percent of the total polyol weight are aminated block copolymers prepared by a) copolymerization of a lower polyol, polyamine or aminoalcohol initiator having a total of two or more reactive hydrogen atoms on hydroxyl and/or primary or secondary amine groups with one or more C$_{2-6}$-alkylene oxides and b) amination of the prepared block copolymer polyol such that the aminated block copolymer contains from 1 to 25 weight percent primary amine groups based upon the total molecular weight.

14. The dispersion of claim 1 wherein the molar ratio between the aromatic acid and epoxy groups is from 0.05 to 0.5:1.

15. A process for the manufacture of the dispersion of claim 1 wherein an epoxy compound is pre-reacted with an aromatic acid and then with an epoxy hardener in the presence of a polyol.

16. The process of claim 15 wherein the epoxy compound and the aromatic acid are heated in the polyol or polyol mixture at a temperature between 25° C. and 250° C. during a period from 20 to 240 minutes.

17. The process of claim 15 wherein the reaction product A) of epoxy resin and aromatic acid and the epoxy hardener B) are reacted with each other under stirring of the reaction mixture.

18. A polyurethane foam which is a product of the reaction of at least one polyol and at least one polyisocyanate in the presence of at least one blowing agent, wherein at least a portion of the reacted polyol is the dispersion of claim 1.

19. The polyurethane foam of claim 18 wherein at least a portion of the reacted polyol is the dispersion of claim 13.

20. A process for preparing a polyurethane foam by reacting at least one polyol and at least one polyisocyanate in the presence of at least one blowing agent wherein at least a portion of the polyol employed is the dispersion of claim 1.

* * * * *